United States Patent [19]

Spies

[11] Patent Number: 4,837,514

[45] Date of Patent: Jun. 6, 1989

[54] METHOD OF REDUCING NOISE IN ELECTROMAGNETIC GEOPHYSICAL EXPLORATION DATA

[75] Inventor: Brian R. Spies, McKinney, Tex.

[73] Assignee: Atlantic Richfield Company, Los Angeles, Calif.

[21] Appl. No.: 219,337

[22] Filed: Jul. 14, 1988

[51] Int. Cl.$^4$ .......................... G01V 3/08; G01V 3/10
[52] U.S. Cl. ..................................... 324/336; 324/357
[58] Field of Search .............. 324/334, 336, 337, 345, 324/357, 358, 359; 364/422, 574

[56] References Cited

U.S. PATENT DOCUMENTS 4,247,821 1/1981 Buselli ................................. 324/336

OTHER PUBLICATIONS

1985—McMechan and Barrodale, "Processing Electromagnetic Data in the Time Domain", Geophys. J.R. Astr. Soc., pp. 177-293 (1985).

*Primary Examiner*—Reinhard J. Eisenzopf
*Assistant Examiner*—Walter E. Snow
*Attorney, Agent, or Firm*—Geoffrey A. Mantooth; Arthur F. Zobal; James C. Fails

[57] ABSTRACT

A method for reducing noise in electromagnetic geophysical exploration data simultaneously measures three orthogonal components of the ambient noise to produce noise records and simultaneously measures three orthogonal components of the decay of current induced into the earth to produce response records. In measuring the records, the receiving antenna is positioned near the electromagnetic center of the transmitting antenna, whereby the maximum component of the induced current decay signal is vertical or perpendicular to the strata in the earth. The impulse response of the earth is determined from the noise records. The noise portion of the vertical response record is determined from the impulse response and the non-vertical response records, whereby the noise portion is removed from the vertical response record.

5 Claims, 4 Drawing Sheets

METHOD OF REDUCING NOISE IN ELECTROMAGNETIC GEOPHYSICAL EXPLORATION DATA

FIELD OF THE INVENTION

The present invention relates to methods for reducing noise in electromagnetic geophysical exploration data.

BACKGROUND OF THE INVENTION

Transient or time domain electromagnetic (TEM) methods of geophysical exploration involve the inducement of eddy currents into the ground by an abrupt change in current flow in a transmitting antenna positioned in proximity with the ground. A receiving antenna detects the decay of the eddy currents as they diffuse outwardly and downwardly in the ground, away from the transmitting antenna. It is desirable to maximize the depth of exploration of TEM methods in order to maximize the effectiveness of TEM geophysical exploration. The depth of penetration of the usable TEM signal is the maximum depth reached by the eddy currents before their signal, as measured at the surface, becomes indistinguishable from noise. The longer in time the eddy current signal can be measured, the greater the depth of penetration. Typical depths of penetration obtained with conventional TEM methods are about 1 km.

Prior art TEM methods have concentrated on increasing the depth of penetration by using larger transmitter currents to increase the eddy current signal. However, significant increases in current, which are expensive to obtain, result in only relatively modest gains in the depth of penetration. This is because the depth of penetration is proportional to the signal-to-noise ratio raised to the 1/5 power. Thus, large increases in the signal-to-noise ratio are needed to obtain moderate increases in the depth of penetration.

A more economical and environmentally sound approach is to increase the depth of penetration by decreasing the noise. Prior art methods of decreasing noise involve stacking of successive data measurements; such methods are time consuming and, in particularly noisy areas, are ineffective in reducing noise to acceptable levels.

It is an object of the present invention to provide a method of reducing noise in TEM methods of geophysical exploration, thereby increasing the depth of exploration.

SUMMARY OF THE INVENTION

The method of the present invention reduces noise in electromagnetic response records obtained from electromagnetic prospecting activities over a portion of the earth having strata which is layered in a relatively parallel arrangement. Noise records are produced by simultaneously measuring three orthogonal components of the ambient noise for a period of time. The noise records are measured at a position near the electromagnetic center of a transmitting antenna means. The electromagnetic center is that position relative to the transmitting antenna means wherein received signals from current induced into the earth by the transmitting antenna means have a maximum component which is perpendicular to the earth strata and negligible components which are parallel to the earth strata. The three orthogonal components are resolvable into first, second, and third orthogonal components, wherein the first and second components are parallel to the earth strata and the third component is perpendicular to the earth strata. The impulse response of the earth is determined from the noise records. Response records are produced by simultaneously measuring three orthogonal components of the decay of current induced into the earth by the transmitting antenna means. The response records have orthogonal components which are resolved into the first, second, and third components. The response record of the third component has an induced current decay portion and a noise portion. The noise portion of the response record of the third component is determined from the response records of the first and second components and the impulse response of the earth. Once the noise portion is determined, it is removed from the response record of the third component to obtain a response record with reduced noise.

DESCRIPTION OF PREFERRED EMBODIMENT

Figure 1:
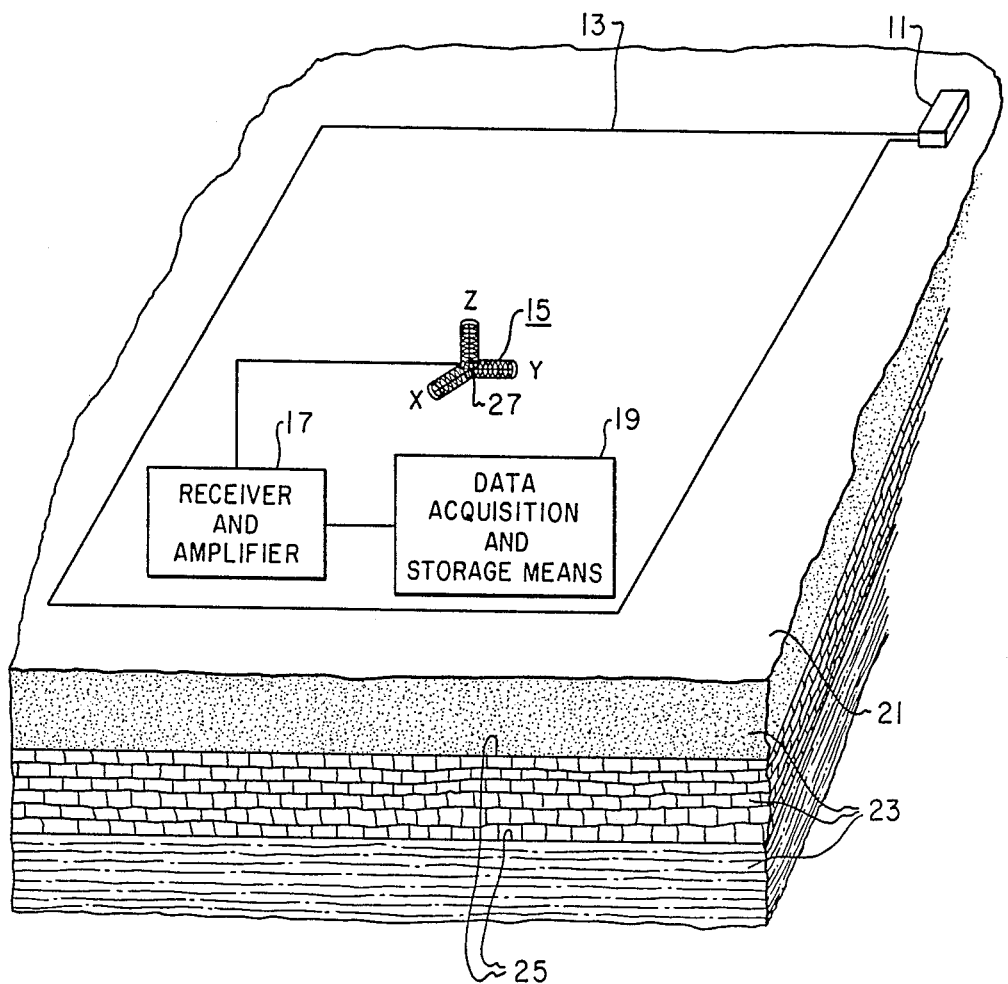
FIG. 1 is a schematic isometric view of a preferred embodiment of the transmitter and receiver arrangement used to practice the method of the present invention.

In FIG. 1, there is shown a schematic isometric view of the equipment which is used to practice the method of the present invention. The equipment includes a transmitter 11, a transmitting antenna 13, a receiving antenna array 15, a receiver and amplifier 17, and data acquisition and storage means 19.

The transmitter 11 is conventional and of the type used for transient electromagnetic prospecting. The transmitter 11 is capable of energizing the transmitting antenna 13 with up to 30 amps of current, and then abruptly de-energizing the transmitting antenna so as to induce current into the earth or ground 21. The transmitting antenna 13 is also conventional and is of the type typically used for transient electromagnetic prospecting. The transmitting antenna 13 is laid on the surface of the ground in a loop configuration, with its ends connected to the transmitter 11.

The receiving antenna array 15 includes three sensors X, Y, Z arranged to receive three orthogonal components of the ambient electromagnetic field. In the preferred embodiment, the receiving antenna array 15 includes three magnetometers X, Y, Z oriented with the longitudinal axes of the magnetometers perpendicular to each other. Induction coils, in place of magnetometers, could be used as sensors for the receiving antenna array. The receiver 17 and its associated amplifier is a broad band conventional instrument with a wide (5 or 6 orders of magnitude) dynamic range. The data acquisition and storage means 19 is capable of simultaneously measuring three-component time series. Although the data acquisition storage means 19 is conventional to general purpose data acquisition tasks, it is not conventional to commercial transient electromagnetic systems, which are incapable of measuring time series.

Typically, electromagnetic geophysical exploration data is acquired using in-loop exploration techniques, wherein the receiving antenna is located at the electromagnetic center (which will be defined hereinbelow) of the transmitting antenna. Furthermore, with the present day interpretation techniques, the data is most susceptible to interpretation if the geology of the explored area is stratified in a parallel arrangement. The geology is stratified in a parallel arrangement when the lines 25 or zones of demarcation between adjacent strata, as seen in a vertical plane taken through the ground, are approximately parallel to one another (see FIG. 1). The parallel arrangement need not be infinite in all directions, but only within the radius of investigation. In many geological areas, the strata are not only parallel, but are horizontally layered as well, wherein the strata 23 extend in a generally horizontal fashion in all directions.

The method of the present invention can be used to reduce noise in data acquired from areas with a geological arrangement other than parallel strata and with the receiving antenna array located anywhere relative to the transmitting antenna electromagnetic center. Because electromagnetic geophysical exploration data is typically acquired using in-loop exploration techniques and is successfully interpreted when acquired from parallel strata areas, the method of the present invention will be described first in connection with typical methods of data acquisition and parallel strata and then will be described in connection with general data acquisition methods and earth geology.

The first step is the placing of the transmitter 13 on the surface of the ground 21. The transmitting antenna 13 has an electromagnetic center 27 which is that position where the electromagnetic field generated by the transmitting antenna is vertical with negligible horizontal components. The electromagnetic center 27 of the transmitting antenna loop 13 is typically the geometric center of the antenna loop.

The next step is the placing of the receiving antenna array 15 near the electromagnetic center 27 of the transmitting antenna 13. Although the most accurate results are obtained with the receiving antenna array 15 positioned exactly at the electromagnetic center 27 of the transmitting antenna, such precision positioning is often difficult to accomplish in the field. It is believed that sufficiently accurate results can be obtained with the receiving antenna array positioned within 10% of the electromagnetic center relative to the transmitting antenna. The receiving antenna array 15 is oriented with respect to the ground 21 so that two of the sensors X, Y are horizontal or parallel to the strata and the third sensor Z is vertical or perpendicular to the strata. Alternatively, the receiving antenna array sensors could be placed in any orientation, wherein the measured components could be resolved into horizontal and vertical components by data processing.

Figure 2:
FIG. 2 is a graph showing a portion of a measured horizontal Hx noise record.
Figure 3:
FIG. 3 is a graph showing a portion of a measured horizontal Hy noise record, which record was measured at the same time as the record of FIG. 2, and which record was measured orthogonal to the Hx component.
Figure 8:
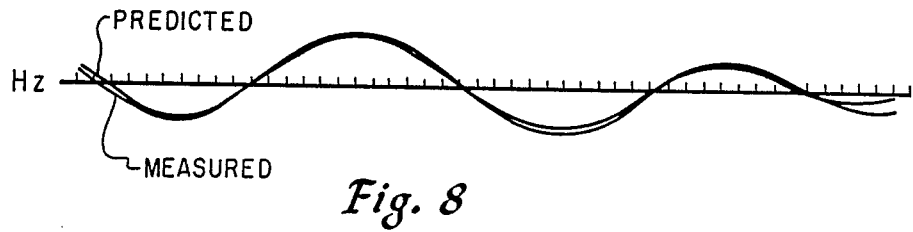
FIG. 8 is a graph showing a portion of a measured vertical Hz noise record, which record was measured at the same time as the noise records of FIGS. 2 and 3, and which record was measured orthogonal to the Hx and Hy components, and showing the predicted vertical Hz noise record superimposed over the measured vertical Hz noise record.

With the equipment set up and the transmitter turned off, time series measurements of the horizontal and vertical components of the ambient electromagnetic noise are taken. The horizontal and vertical components are measured simultaneously, producing noise records. The ambient noise is measured for about 1–2 minutes, and is sampled at a rate of about 1–10 ms. If it is desired to have frequencies higher than about 100 Hertz, then the sampling rate should be increased accordingly. In FIGS. 2 and 3, simultaneous portions of noise records for the respective horizontal ambient noise magnetic fields Hx and Hy, as measured with the respective sensors X, Y, are shown. In FIG. 8, a portion of the noise record for the vertical ambient noise magnetic field Hz, as measured with the sensor Z, is shown, which portion is simultaneous with the noise records of FIGS. 2 and 3. In FIGS. 2–8, the hash marks along the horizontal axes are at one second intervals.

The impulse response of the earth, at the location of the receiving antenna array, is determined from noise records. The impulse response, X(t) and Y(t), of the earth can be thought of as a filter and is determined by the following relationship:

$$Hz(t) = [Hx(t)*X(t)] + [Hy(t)*Y(t)], \qquad (1)$$

which linearly relates the vertical ambient noise field Hz(t) to the horizontal ambient noise fields Hx(t) and Hy(t). In equation (1), Hx(t) is the ambient noise field as measured by the sensor X, Hy(t) is the ambient noise field as measured by the sensor Y, Hz(t) is the ambient noise field as measured by the sensor Z, and the * operator denotes convolution.

Equation (1) represents a system of linear equations that can be written in matrix form. The system of linear equations can be solved by a variety of techniques, including least squares and linear programming techniques. The least squares technique will be described hereinbelow. Equation (1) can be decomposed into two coupled subsystems:

$$[X(t)*Hx(t)] = Hz(t) - [Y(t)*Hy(t)] \quad (2)$$

$$[Y(t)*Hy(t)] = Hz(t) - [X(t)*Hx(t)]. \quad (3)$$

Figure 4:
FIG. 4 is a graph showing the coefficients for the filter X as determined from the Hx, Hy, and Hz noise records of respective FIGS. 2, 3, and 8.
Figure 5:
FIG. 5 is a graph showing the coefficients for the filter Y as determined from the Hx, Hy, and Hz noise records of respective FIGS. 2, 3, and 8.
Figure 6:
FIG. 6 is a graph showing the convolution of the graphs of the Hx noise record of FIG. 2 and the filter X of FIG. 4.
Figure 7:
FIG. 7 is a graph showing the convolution of the graphs of the Hy noise record of FIG. 3 and the filter Y of FIG. 5.

An iterative solution of the two coupled equations (2) and (3) is used and proceeds as follows: A starting estimate of the vector Y(t)*Hy(t) is inserted into equation (2), which is solved for vector X(t). This X(t) is inserted into equation (3) which is solved for the vector Y(t). This Y(t) is put into the equation (2) and solved for X(t), and so on until the values of X(t) and Y(t) become stationary to the desired number of significant figures. The parameters of the impulse response include the length of the vectors X(t) and Y(t) and the spacing of the elements within the vectors X(t) and Y(t), which parameters can be varied to obtain optimum performance of the processing equipment. In FIGS. 4 and 5, there are shown respective three-point filters X(t) and Y(t), which filters were determined from the measured time series of FIGS. 2, 3, and 8.

After the noise records are obtained, the transmitter 11 is turned on to energize the transmitting antenna 13 with current. Then, the transmitter 11 is turned off so as to abruptly deenergize the transmitting antenna 13, wherein current is induced into the earth 21.

Figure 9:
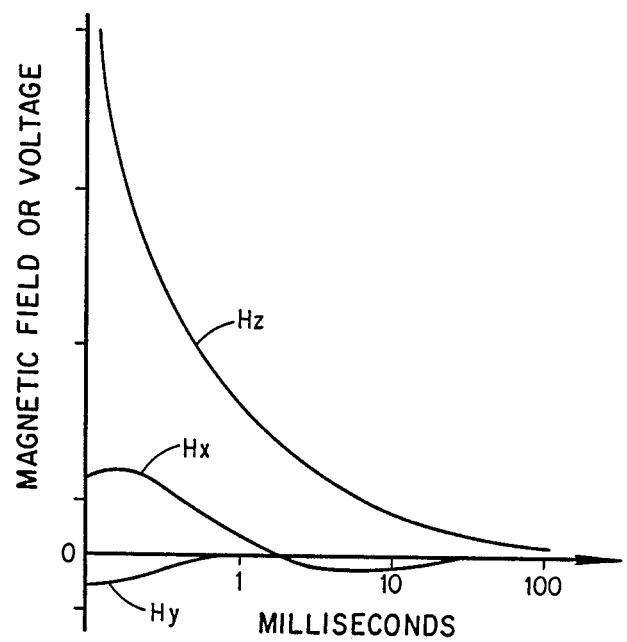
FIG. 9 is a graph showing typical simultaneous Hx, Hy, and Hz transient electromagnetic response records as obtained within the receiving antenna array in the electromagnetic center of the transmitting antenna and with parallel strata.

Upon the de-energization of the transmitting antenna 13, the receiving antenna array 15, the receiver and amplifier 17, and the data acquisition and storage means 19 begin to measure the induced current as it decays. An electromagnetic response record of the decay of the induced current is made for each of the vertical and horizontal components. Thus Hx, Hy, Hz response records are simultaneously made. FIG. 9 shows typical simultaneous Hx, Hy, and Hz response records. Because the receiving antenna array 15 is purposefully located at or near the electromagnetic center 27 of the transmitting antenna 13, the signal for the decay of the induced current shows up predominantly in the Hz response record. The Hx and Hy response records are overwhelmingly composed of the ambient noise and, particularly at late times, contain little or no signal for the decay of the induced current.

Figure 10:
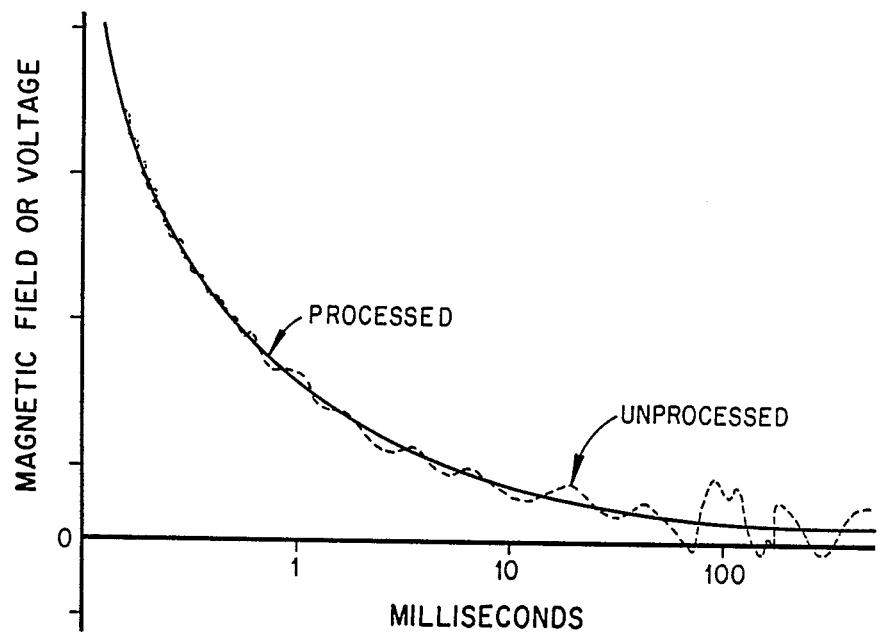
FIG. 10 is a graph showing as a dashed line a typical unprocessed Hz transient electromagnetic response record and as a solid line the resulting Hz response record which has been processed according to the method of the present invention.

The unprocessed Hz response record has both an induced current decay portion and a noise portion (see FIG. 10). The noise portion of the Hz response record is determined from equation (1), using the calculated values for X(t) and Y(t), and the measured Hx and Hy response records for Hx(t) and Hy(t). In FIG. 8, there is shown a predicted Hz noise record that was calculated from Hx and Hy components and the impulse response X(t), Y(t). The closeness of fit between the measured Hz and the predicted Hz is quite good. Once the noise portion of the Hz response record is known, it is removed from the Hz response record by conventional subtraction techniques. The end result is a processed response record containing the decay of the induced current with a reduction in noise (see FIG. 10). Practically, the reduction in noise enables the measurement of the decay of the induced current for longer periods of time, thus allowing an increase in the depth of penetration of the transient electromagnetic technique.

The ambient noise records can be measured either before or after the response records are measured.

One important aspect of the method the present invention is that the method is able to predict what the noise affecting the transient electromagnetic signal of interest is at the time of measurement of the induced current decay. The method of the present invention is able to predict what the noise will be even though the vertical and horizontal noise components are constantly changing with respect to time. The prediction of noise is done in part by using the impulse response, X(t) and Y(t), of the earth, which is stationary with respect to time, and in part by taking advantage of the horizontally layered strata in many geological areas wherein the electromagnetic response signal is always perpendicular to the strata at the electromagnetic center of the transmitting antenna. The method of the present invention makes simultaneous measurements of three orthogonal components of the ambient noise to obtain the information needed to determine the impulse response. Then simultaneous measurements of three orthogonal components are made during the decay of the induced current. Only the component that is perpendicular to the strata has the decay signal of interest. The parallel components contain primarily noise. The parallel components, together with the impulse response, are used to predict what the noise portion is in the perpendicular component. Once known, the predicted noise portion can be removed from the perpendicular component thereby resulting in reduced noise in the perpendicular component.

The method of the present invention is particularly well suited for reducing noise in data arising from natural sources such as lightning. The polarization and direction of noise from such natural sources is constantly changing.

The method of the present invention will now be described in connection with general data acquisition methods and earth geology. The transmitting antenna 13 is placed on the surface of the ground as described above. The receiving antenna array 15 is placed in the desired location. The receiving antenna array 15 need not be placed in the electromagnetic center of the transmitting antenna 13 and may be placed either inside or outside of the transmitting antenna loop. For simplicity, the receiving antenna array 15 is oriented as described above with the sensor Z measuring the vertical component and the sensors X and Y measuring the horizontal components. Time series measurements of the ambient electromagnetic noise are taken to produce noise records. As described above, the receiving antenna array 15 simultaneously measures three orthogonal components of the ambient electromagnetic noise. The transmitter is turned on and then abruptly de-energized, wherein a response record of each component of the decay of the induced current is produced. The response records are measured simultaneously with the receiving antenna array located at the same position as for the measurements of the noise records.

Figure 11:
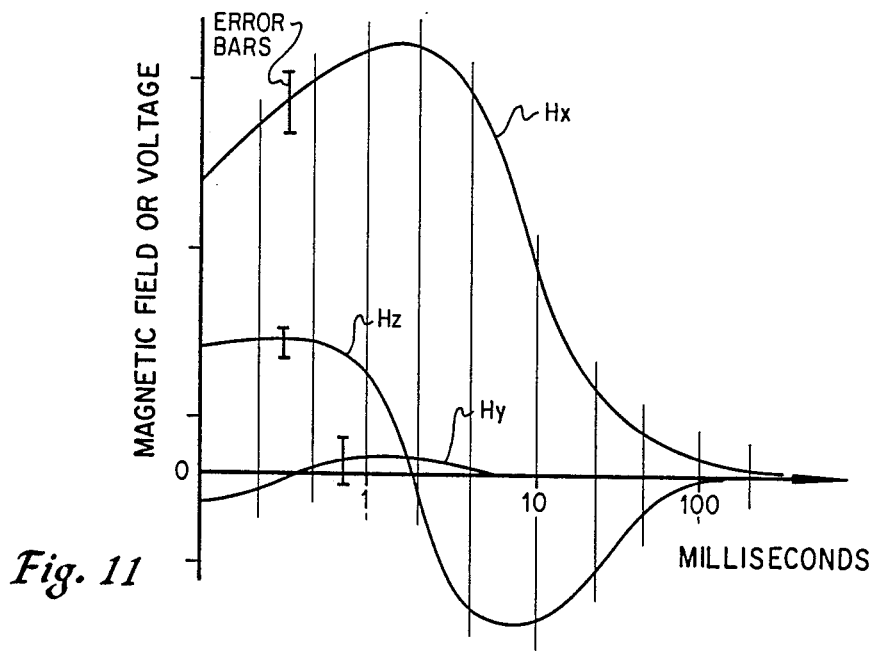
FIG. 11 is a graph showing typical Hx, Hy, and Hz transient electromagnetic response records for arbitrary receiving antenna locations and arbitrary geology.

FIG. 11 illustrates typical three component transient decay curves. Each component, Hx, Hy, and Hz, make up a response record. As shown in FIG. 11, in the general case of arbitrary receiving antenna array location and arbitrary geology, the Hx or Hy components may have larger magnitudes than the Hz components. The Hx, Hy, and Hz components can be represented by a response vector that is a composite of the Hx, Hy, and Hz vectors. However, the composite response vector changes direction over time with respect to the coordinate system or frame of reference established by the receiving antenna array 15. The position of the composite response vector is effectively frozen in time for data processing by dividing the response records with respect to time into plural segments to form windows of time. Each window is made up of simultaneous segments of the Hx, Hy, and Hz components and is delineated by vertical bars in FIG. 11. Generally, 3-5 windows per decade of time are used. Then, the average response vector for each window is determined by taking the average of the composite response vectors in the respective window.

Figure 12:
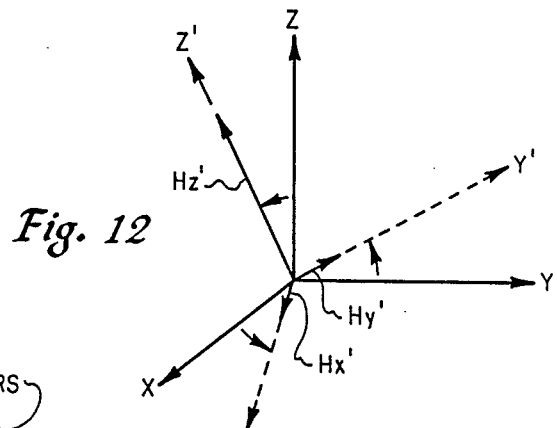
FIG. 12 is a diagram showing an unrotated coordinate system (x, y, z), a rotated coordinate system (x', y', z'), an average response vector Hz', and noise vectors Hx', Hy' in one time window.

The average response vector for each window of time is determined from the respective segments of the Hx, Hy, and Hz components. An average response record is produced from the average response vectors. In FIG. 12, the average response vector Hz' for one time window is shown. The average response vector Hz' has an induced current decay position and a noise portion. In addition to the average response vector, there are average noise vectors Hx', Hy', shown as being orthogonal to the average response vector and to each other in FIG. 12. Average noise records are produced from the average noise vectors. The noise vectors Hx', Hy' result from the uncertainty in the magnitudes of the decay curves in the response records. The range of uncertainty is shown as vertical error bars in FIG. 11.

Figure 13:
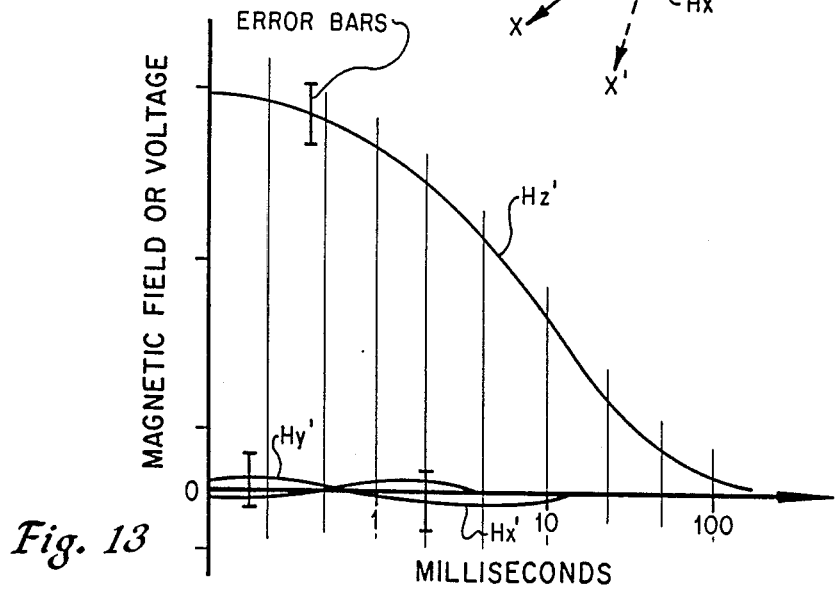
FIG. 13 is a graph showing typical three component transient decay curves obtained after rotation of the data to a new coordinate system in one time window.

Next, for each window of time, a new frame of reference is established by rotating the coordinate system of the receiving antenna array 15 (which in the preferred embodiment has horizontal x and y axes and a vertical z axis). The new coordinate system has a z' axis colinear to the respective average response vector Hz' and x' and y' axes colinear to the respective noise vectors Hx', Hy'. In FIG. 13, there are shown transient decay curves in which the data has been rotated to the new respective coordinate system for the respective windows of time. FIG. 13 is similar to FIG. 9, where the data was taken with the receiving antenna array in the electromagnetic center of the transmitter, over parallel strata, because in both Figures the decay signal has been predominantly isolated into one component Hz (Hz') which component is of greater magnitude than the noise component Hx, Hy (Hx', Hy').

After the new coordinate system for each time window has been established, the noise records are rotated from the coordinate system of the receiving antenna array (x, y, z) to the new coordinate system (x', y', z'). The impulse response of the earth is determined from the rotated noise records, for each time window.

The noise portion of the average response vector Hz' for each time window is determined from the respective impulse response of the earth, the respective noise vectors Hx' and Hy', and equation (1). Once the noise portion of the respective average response vector Hz' is known, it is removed from the average response vector Hz, by conventional subtraction techniques. The result is a processed response record containing the decay of induced current with a reduction in noise.

The foregoing disclosure and the showing made in the drawings are merely illustrative of the principles of this invention and are not to be interpreted in a limiting sense.

I claim:

1. A method for reducing noise in electromagnetic response records obtained from electromagnetic prospecting activities over a portion of the earth having strata which is layered in a relatively parallel arrangement, comprising the steps of:

(a) simultaneously measuring three orthogonal components of the ambient noise for a period of time to produce noise records, said three components resolvable into first, second, and third orthogonal components, wherein the first and second components are parallel to said strata and the third component is perpendicular to said strata, said noise records measured at a position near an electromagnetic center of a transmitting antenna means, said electromagnetic center being that position relative to said transmitting antenna means wherein the electromagnetic field generated by said transmitting antenna means is perpendicular to said earth strata with negligible parallel components;

(b) determining from said noise records the impulse response of the earth;

(c) simultaneously measuring three orthogonal components of the decay of current induced into the earth so as to create transient electromagnetic response records, said response records having orthogonal components which have been resolved into said first, second, and third orthogonal components, said response record of the third component having an induced current decay portion and a noise portion;

(d) determining from the response records of the first and second components in said response record and said earth impulse response the noise portion of said third component response record;

(e) removing said determined noise portion of said third component from said third component to obtain a response record with reduced noise.

2. The method of claim 1 wherein said strata is generally horizontally layered and said first and second components are horizontal and said third component is vertical.

3. A method for reducing noise in electromagnetic response records obtained from electromagnetic prospecting activities, comprising the steps of:

(a) placing transmitting antenna means for inducing current into earth over a portion of earth having strata which is layered in a relatively parallel arrangement, said transmitting antenna means having an electromagnetic center, said electromagnetic center being that position relative to said transmitting antenna means wherein received signals from current induced into the earth by said transmitting antenna means have a maximum component which is perpendicular to said earth strata and negligible components which are parallel to said earth strata;

(b) placing receiving antenna means near the electromagnetic center of said transmitting antenna means, said receiving antenna means comprising sensors for measuring three orthogonal components of the ambient electromagnetic field, wherein the orthogonal measured components can be resolved into first, second, and third orthogonal components, wherein the first and second components are parallel to the layered earth strata and the third component is perpendicular to the layered earth strata;

(c) simultaneously measuring three orthogonal components of the ambient noise with said receiving antenna means for a period of time to produce noise records, said noise records having orthogonal components which have been resolved into said first, second, and third orthogonal components;

(d) determining from said noise records the impulse response of the earth at the position of said receiving antenna means;
(e) energizing said transmitting antenna means with current and then abruptly de-energizing said transmitting antenna means so as to induce current into the earth;
(f) simultaneously measuring three orthogonal components of the decay of the induced current with said receiving antenna means so as to create transient electromagnetic response records, said response records having orthogonal components which have been resolved into said first, second, and third orthogonal components, said response record of the third component having an induced current decay portion and a noise portion;
(g) determining from the response records of the first and second components in said response record and said earth impulse response the noise portion of said third component response record;
(h) removing said determined noise portion of said third component from said third component to obtain a response record with reduced noise.

4. The method of claim 3 wherein said strata is generally horizontally layered and said first and second components are horizontal and said third component is vertical.

5. A method for reducing noise in electromagnetic response records obtained from electromagnetic prospecting activities over a portion of the earth, comprising the steps of:
(a) simultaneously measuring three orthogonal components of the ambient noise for a period of time to produce noise records;
(b) simultaneously measuring three orthogonal components of the decay of current induced into the earth so as to create transient electromagnetic response records, said response records measured at the same location relative to the earth that said noise records are measured;
(c) dividing with respect to time said response records into plural segments, and forming windows of time with each window being made up of simultaneous segments from said response records;
(d) determining for each window an average transient response vector from the respective segments of the three response records so as to create an average response record, said respective average response vectors each having an induced current decay portion and a noise portion, wherein said determination of the respective average response vector results in respective first and second noise vectors that are orthogonal to said average response vector;
(e) establishing for each window a frame of reference having orthogonal first, second, and third axes, with said respective third axis being colinear to the respective average response vector and said respective first and second axes being colinear to the respective first and second noise vectors;
(f) rotating for each window said noise records into said respective frame of reference, and determining for each window from said rotated noise records the impulse response of the earth;
(g) determining for each window the noise portion of said respective average response vector from said respective first and second noise vectors and said respective earth impulse response;
(h) removing for each window said determined noise portion of said respective average response vector from said average response vector to obtain an average response record with reduced noise.

* * * * *